United States Patent [19]

Carl et al.

[11] Patent Number: 4,650,551
[45] Date of Patent: Mar. 17, 1987

[54] SUPPORTED ION EXCHANGE MEMBRANE FILMS

[75] Inventors: William P. Carl, Angleton; Jeffrey D. Birdwell, Lake Jackson, both of Tex.

[73] Assignee: The Dow Chemical Company, Midland, Mich.

[21] Appl. No.: 739,934

[22] Filed: May 31, 1985

[51] Int. Cl.$^4$ .................. C25B 1/00; C25B 13/02; C09J 5/02

[52] U.S. Cl. .................. 204/59 R; 204/98; 204/252; 204/296; 156/308.6; 521/27

[58] Field of Search .............. 204/59 R, 98, 128, 252, 204/296; 521/27; 156/308.6

[56] References Cited

U.S. PATENT DOCUMENTS

| | | | |
|---|---|---|---|
| 3,282,875 | 11/1966 | Connolly et al. | 260/29.6 |
| 3,692,569 | 9/1972 | Grot | 117/138.8 UF |
| 3,770,567 | 11/1973 | Grot | 161/189 |
| 3,909,378 | 9/1975 | Walmsley | 204/98 |
| 3,917,499 | 11/1975 | Holden | 156/308.6 |
| 3,925,135 | 12/1975 | Grot | 156/213 |
| 4,025,405 | 5/1977 | Dotson et al. | 204/98 |
| 4,065,366 | 12/1977 | Oda et al. | 204/98 |
| 4,076,571 | 2/1978 | Specht et al. | 156/308.6 |
| 4,116,888 | 9/1978 | Ukihashi et al. | 521/31 |
| 4,123,336 | 10/1978 | Seko et al. | 204/98 |
| 4,126,588 | 11/1978 | Ukihashi et al. | 521/31 |
| 4,147,844 | 4/1979 | Babinsky et al. | 521/27 |
| 4,151,052 | 4/1979 | Goto et al. | 204/95 |
| 4,176,215 | 11/1979 | Molnar et al. | 521/27 |
| 4,178,218 | 12/1979 | Seko | 204/98 |
| 4,192,725 | 3/1980 | Dotson et al. | 204/98 |
| 4,209,635 | 6/1980 | Munekata et al. | 560/183 |
| 4,212,713 | 7/1980 | Suhara et al. | 204/98 |
| 4,251,333 | 2/1981 | Suhara et al. | 204/98 |
| 4,253,900 | 3/1981 | Dege et al. | 156/308.6 |
| 4,259,226 | 3/1981 | Suhara et al. | 260/33.4 F |
| 4,270,996 | 6/1981 | Suhara et al. | 204/98 |
| 4,272,560 | 6/1981 | Baczek et al. | 427/58 |
| 4,298,697 | 11/1981 | Baczek et al. | 521/27 |
| 4,318,785 | 3/1982 | Gunjima et al. | 156/308.6 |
| 4,324,606 | 4/1982 | Withers | 156/272.2 |
| 4,329,435 | 5/1982 | Kimoto et al. | 521/38 |
| 4,330,654 | 5/1982 | Ezzell et al. | 526/243 |
| 4,337,137 | 6/1982 | Ezzell | 204/252 |
| 4,337,211 | 6/1982 | Ezzell et al. | 260/456 F |
| 4,340,680 | 7/1982 | Asawa et al. | 521/27 |
| 4,341,605 | 7/1982 | Solenberger et al. | 204/98 |
| 4,348,310 | 9/1982 | Silva et al. | 524/167 |
| 4,357,218 | 11/1982 | Seko | 204/98 |
| 4,358,412 | 11/1982 | Ezzell et al. | 260/968 |
| 4,358,545 | 11/1982 | Ezzell et al. | 521/27 |
| 4,360,601 | 11/1982 | Copeland et al. | 521/27 |
| 4,399,183 | 8/1983 | Withers | 428/247 |
| 4,417,969 | 11/1983 | Ezzell et al. | 204/252 |
| 4,437,951 | 3/1984 | Bissot et al. | 204/98 |
| 4,437,952 | 3/1984 | Smith et al. | 204/98 |
| 4,462,877 | 7/1984 | Ezzell et al. | 204/98 |
| 4,470,889 | 9/1984 | Ezzell et al. | 204/98 |
| 4,478,695 | 10/1984 | Ezzell et al. | 204/98 |

FOREIGN PATENT DOCUMENTS

| | | |
|---|---|---|
| 0027009 | 4/1981 | European Pat. Off. . |
| 0066369 | 12/1982 | European Pat. Off. . |
| 0122049 | 10/1984 | European Pat. Off. . |
| 2051091A | 1/1981 | United Kingdom . |
| 2060703A | 5/1981 | United Kingdom . |
| 2064586A | 6/1981 | United Kingdom . |
| 2066824A | 7/1981 | United Kingdom . |

OTHER PUBLICATIONS

"Dual Cohesive Energy Densities of Perfluorosulfonic Acid (Nafion) Membrane", Richard S. Yeo, *Polymer*, p. 432, vol. 21, Apr. 1980.

"Solubility Characteristics of Perfluorinated Polymers with Sulfonyl Fluoride Functionality", G. H. McCain and M. J. Covitch, *Journal Electrochemical Society: Electrochemical Science and Technology*, Jun. 1984, pp. 1350–1352.

Primary Examiner—Terryence Chapman
Attorney, Agent, or Firm—James H. Dickerson, Jr.

[57] ABSTRACT

The invention is a method for forming a supported membrane film comprising:
(a) at least partially coating a polytetrafluoroethylene fabric with a sizing composition;
(b) contacting the coated polytetrafluoroethylene fabric with a membrane film having sites convertible to ion exchange groups; and
(c) heating the polytetrafluoroethylene fabric and the membrane film while maintaining the fabric and the film in contact.

34 Claims, No Drawings

SUPPORTED ION EXCHANGE MEMBRANE FILMS

The invention is a method for supporting an ion exchange active film and particularly for supporting an ion exchange membrane film using polytetrafluoroethylene fabric.

BACKGROUND OF THE INVENTION

Polytetrafluoroethylene fabrics are fabrics woven from strands of polytetrafluoroethylene. Polytetrafluoroethylene is commonly known as Teflon and is a registered trademark of E.I. DuPont Company.

Polytetrafluoroethylene fabrics are available in many varieties from a variety of distributors. Typical of the polytetrafluoroethylene fabrics is a fabric sold by Stern and Stern Textiles, Incorporated, New York, N.Y., called T41-30. It is a lenoweave cloth with 45×21 ends/inch and has a thickness of 0.010 inch. It has a weight of 4.35 ounces per square yard.

Polytetrafluoroethylene fabrics are used for a variety of purposes including supports for fluoropolymer ion exchange active films. Such films are commonly used as ion exchange membranes in electrolytic cells.

The prior art has attempted to attach polytetrafluoroethylene fabrics to ion exchange membrane films using heat treatment and extraction procedures rather than stabilizing the cloth itself (see U.S. Pat. No. 4,272,560).

Other known relevant art is known to include: U.S. Pat. Nos. 3,770,567; 3,925,135; 4,272,560; 4,324,606; 4,399,183; 4,341,605; and 4,437,951.

It would be highly desirable to be able to size polytetrafluoroethylene fabrics. The present invention provides such a method.

Ion exchange active fluoropolymer films have been widely used in industry, particularly as ion exchange membranes in chlor-alkali cells. Such membranes are made from fluorinated polymers having ion exchange active groups attached to pendant groups from the polymeric backbone.

Such polymers are usually thermoplastic and may be fabricated into films or sheets while in their molten form using mechanical extrusion equipment.

Forming membrane structures and support structures into multiple layers is the subject of several patents and applications including U.S. Pat. Nos. 3,925,135; 3,909,378; 3,770,567; and 4,341,605. However, these methods use complicated procedures and equipment including such things as vacuum manifolds, rolls and release media.

Burrell states the theory of Bagley [*J. Paint Tech.*, Volume 41, page 495 (1969)] predicts a non-crystalline polymer will dissolve in a solvent of similar solubility parameter without chemical similarity, association, or any intermolecular force. However, he fails to mention anything about the solubility of polymers demonstrating crystallinity.

Currently, it is difficult to attach polytetrafluoroethylene fabrics to ion exchange active membrane films. In fact, as currently practiced, the fabric is only embedded into the membrane film and not attached. Internal voids are left within the threads and at the intersections of the weave.

It would be highly desirable to have a supported ion exchange membrane film supported by a polytetrafluoroethylene fabric where the fabric is more intimately attached and a more integral part of the structure. Such an article is the subject of the present invention.

SUMMARY OF THE INVENTION

The invention is a method for supporting an ion exchange active film comprising:
(a) at least partially coating a polytetrafluoroethylene fabric with a sizing composition;
(b) contacting the coated polytetrafluoroethylene fabric with a film having sites convertible to ion exchange groups; and
(c) heating the polytetrafluoroethylene fabric and the film while maintaining the fabric and the film in contact.

The invention also includes the supported membrane made by the above process.

DETAILED DESCRIPTION OF THE INVENTION

"Sizing composition" is a composition containing a treating agent and perfluorinated polymer containing sites convertible to ion exchange groups, wherein the polymer is at least partially dissolved in the treating agent.

The present invention can be used to support ion exchange media, films and articles for use in electrolytic cells, fuel cells and gas or liquid permeation units. In addition, the present invention can be used with functional or non-functional fluoropolymers.

Polytetrafluoroethylene fabrics are limp cloths before sizing. The threads usually tend to slide about during handling and are, thus, very difficult to handle without changing the shape of the fabric. The present invention provides a method for sizing polytetrafluoroethylene fabrics.

Polytetrafluoroethylene fabrics suitable for use in the present invention are those commercially available from a variety of producers. The denier of the fabric is not critical to the successful operation of the present process. Likewise, the overall physical dimensions of the fabrics are not critical.

Polytetrafluoroethylene fabrics are treated with a solution or dispersion of a treating agent and a perfluorinated polymer.

Perfluorinated polymers suitable for use in the present invention may be used to coat the polytetrafluoroethylene fabrics and may be used as the ion exchange membrane film. The same polymer may be used for both, or the polymers may be different.

Non-ionic forms of perfluorinated polymers suitable for use in the present invention include those described in the following patents: U.S. Pat. Nos. 3,282,875; 3,909,378; 4,025,405; 4,065,366; 4,116,888; 4,123,336; 4,126,588; 4,151,052; 4,176,215; 4,178,218; 4,192,725; 4,209,635; 4,212,713; 4,251,333; 4,270,996; 4,329,435; 4,330,654; 4,337,137; 4,337,211; 4,340,680; 4,357,218; 4,358,412; 4,358,545; 4,417,969; 4,462,877; 4,470,889; and 4,478,695; European Patent Application No. 0,027,009. Such polymers have equivalent weights of from about 500 to about 2000.

Particularly preferred are copolymers of monomer I with monomer II (as defined below). Optionally, a third type of monomer may be copolymerized with I and II.

The first type of monomer is represented by the general formula:

$$CF_2=CZZ' \qquad (I)$$

where: Z and Z' are independently selected from the group consisting of —H, —Cl, —F, or CF₃.

The second monomer consists of one or more monomers selected from compounds represented by the general formula:

$$Y-(CF_2)_a-(CFR)_b-(CFR')_c-O-[CF(CF_2X)-CF_2-O]_n-CF=CF_2 \quad (II)$$

where:
Y is selected from the group consisting of —SO₂Z, —CN, —COZ and C(R³ᵢ)(R⁴ᵢ)OH;
Z is I, Br, Cl, F, OR, or NR₁R₂;
R is a branched or linear alkyl radical having from 1 to about 10 carbon atoms or an aryl radical;
R³ᵢ and R⁴ᵢ are independently selected from the group consisting of perfluoralklyl radicals having from 1 to about 10 carbon atoms;
R₁ and R₂ are independently selected from the group consisting of H, a branched or linear alkyl radical having from 1 to about 10 carbon atoms or an aryl radical;
a is 0–6;
b is 0–6;
c is 0 or 1;
provided a+b+c is not equal to 0;
X is Cl, Br, F or mixtures thereof when n>1;
n is 0 to 6; and
$R_f$ and $R'_f$ are independently selected from the group consisting of F, Cl, perfluoroalkyl radicals having from 1 to about 10 carbon atoms and fluorochloroalkyl radicals having from 1 to about 10 carbon atoms.

Particularly preferred is when Y is SO₂F or —COOCH₃; n is 0 or 1; $R_f$ and $R'_f$ are F; X is Cl or F; and a+b+c is 2 or 3.

The third and optional monomer suitable is one or more monomers selected from the compounds represented by the general formula:

$$Y'-(CF_2)_{a'}-(CFR)_{b'}-(CFR')_{c'}-O-[CF(CF_2X')-CF_2-O]_{n'}-CF=CF_2 \quad (III)$$

where:
Y' is F, Cl or Br;
a' and b' are independently 0–3;
c' is 0 or 1;
provided a'+b'+c' is not equal to 0;
n' is 0–6;
$R_f$ and $R'_f$ are independently selected from the group consisting of Br, Cl, F, perfluoroalkyl radicals having from about 1 to about 10 carbon atoms, and chloroperfluoroalkyl radicals having from about 1 to about 10 carbon atoms; and
X' is F, Cl, Br, or mixtures thereof when n'>1.

The monomer FSO₂CF₂CF₂OCF=CF₂ has a density of about 1.65 grams per cubic centimeter and polytetrafluoroethylene has a density of about 2.2 grams per cubic centimeter. A copolymer of this monomer with tetrafluoroethylene would, thus, have a density between the two values. It has been discovered that certain perhalogenated treating agents have a surprising effect of dissolving and dispersing the polymers, especially when the polymers are in a finely divided state. Treating agents suitable for use in the present invention to form the sizing compositions of the present invention preferably have the following characteristics:
a boiling point less than about 110° C.;
a density of from about 1.55 to about 2.97 grams per cubic centimeter;
a solubility parameter of from greater than about 7.1 to about 8.2 hildebrands.

It is desirable that the treating agents have a boiling point of from about 30° C. to about 110° C. The ease of removal of the treating agent and the degree of treating agent removal is important in producing various films, coatings and the like, without residual treatment agent; hence a reasonable boiling point at atmospheric pressure allows convenient handling at room conditions yet effective treating agent removal by atmospheric drying or mild warming.

It is desirable that the treating agent has a density of from about 1.55 to about 2.97 grams per cubic centimeter. The polymers of the present invention have densities on the order of from about 1.55 to about 2.2 grams per cubic centimeter. Primarily, the polymers have densities in the range of from about 1.6 to about 2.2 grams per cubic centimeter. Treating agents of the present invention will therefore swell dissolve and disperse small particles of this polymer, aided by the suspending effects of the similarity in densities.

The prior art did not balance density. They were interested in forming solutions and solutions do not separate.

Solubility parameters are related to the cohesive energy of compounds. Calculating solubility parameters are discussed in U.S. Pat. No. 4,348,310, the teachings of which are incorporated by reference for the purpose of their teachings on solubility parameters.

It is important that the treating agent has a solubility parameter of from greater than about 7.1 to about 8.2 hildebrands. The similarity in cohesive energy densities between the treating agent and the polymer determine the likelihood of dissolving swelling or dispersing the polymer in the treating agent.

It is preferable that the treating agent has a vapor pressure of up to about 760 millimeters of mercury at the specified temperature limits at the point of treating agent removal. The treating agent should be conveniently removed without the necessity of higher temperatures or reduced pressures involving extended heating such as would be necessary in cases similar to U.S. Pat. No. 3,692,569 or the examples in British Patent No. 2,066,824A in which low pressures (300 millimeters) had to be employed as well as non-solvents to compensate for the higher boiling points and low vapor pressures of the complex solvents.

It has been found that treating agents represented by the following general formula are particularly preferred provided they also meet the characteristics discussed above (boiling point, density, and solubility parameter):

$$XCF_2-CYZ-X'$$

wherein:
X is selected from the group consisting of F, Cl, Br, and I;
X' is selected from the group consisting of Cl, Br, and I;
Y and Z are independently selected from the group consisting of H, F, Cl, Br, I and R';
R' is selected from the group of perfluoroalkyl radicals and chloroperfluoroalkyl radicals having from 1 to 6 carbon atoms.

The most preferred treating agents are 1,2-dibromotetrafluoroethane (commonly known as Freon 114 B 2)

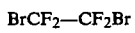

and 1,2,3-trichlorotrifluoroethane (commonly known as Freon 113):

Of these two treating agents, 1,2-dibromotetrafluoroethane is the most preferred treating agent. It has a boiling point of about 47.3° C., a density of about 2.156 grams per cubic centimeter, and a solubility parameter of about 7.2 hildebrands.

1,2-dibromotetrafluoroethane is thought to work particularly well because, though not directly polar, it is highly polarizable. Thus, when 1,2-dibromotetrafluoroethane is associated with a polar molecule, its electron density shifts and causes it to behave as a polar molecule. Yet, when 1,2-dibromotetrafluoroethane is around a non-polar molecule, it behaves as a non-polar treating agent. Thus, 1,2-dibromotetrafluoroethane tends to dissolve the non-polar backbone of polytetrafluoroethylene and also the polar, ion-exchange-containing pendant groups. Its solubility is calculated to be from about 7.13 to about 7.28 hildebrands.

It is surprising that an off-the-shelf, readily-available compound such as 1,2-dibromotetrafluoroethane would act as a solvent for the fluoropolymers described above. It is even more surprising that 1,2-dibromotetrafluoroethane happens to have a boiling point, a density and a solubility parameter such that it is particularly suitable for use as a solvent dispersant in the present invention.

In practicing the present invention, the polymer may be in any physical form. However, it is preferably in the form of fine particles to speed dissolution and dispersion of the particles into the treating agent. Preferably, the particle size of the polymers is from about 0.01 microns to about 840 microns. Most preferably, the particle size is less than about 250 microns.

To dissolve and disperse the polymer particles into the treating agent, the polymer particles are placed in contact with the treating agent of choice and intimately mixed. The polymer and the treating agent may be mixed by any of several means including, but not limited to, shaking, stirring, milling or ultra sonic means. Thorough, intimate contact between the polymer and the treating agent are needed for optimum dissolution and dispersion.

The polymers of the present invention are dissolved and dispersed into the treating agents at concentrations ranging from about 0.1 to about 50 weight percent of polymer to treating agent. At concentrations below about 0.1 weight percent, there is insufficient polymer dissolved and dispersed to be effective as a medium for coating articles or forming films within a reasonable number of repetitive operations. Conversely, at concentrations above about 50 weight percent there is sufficient polymer present as a separate phase such that viable, coherent films and coatings of uniform structure cannot be formed without particulate agglomerates, etc.

Preferably, the concentration of the polymer in the treating agent is from about 0.1 to about 20 weight percent. More preferably, the concentration of the polymer in the treating agent is from about 0.3 to about 10 weight percent. Most preferably, the concentration is from about 5 to about 15 weight percent.

Dispersion of the polymer into the treating agent can be conducted at room temperature conditions. However, the optimum dispersion is best achieved at temperatures from about 10° C. to about 50° C. At temperatures above about 50° C. the measures for dissolving and dispersing the polymer have to include pressure confinement for the preferred treating agents or method of condensing the treating agents. Conversely, at temperatures below about 10° C. many of the polymers of the present invention are below their glass transition temperatures thus causing their dispersions to be difficult to form at reasonable conditions of mixing, stirring, or grinding.

The sizing composition of the present invention into the treating agent are best conducted at atmospheric pressure. However, dispersion can be achieved at pressures from about 760 to about 15,000 millimeters mercury or greater. At pressures below about 760 millimeters of mercury, the operation of the apparatus presents no advantage in dissolving and dispersing polymers, rather hindering permeation into the polymers and thus preventing forming of the sizing compositions.

Conversely, pressures above about 760 millimeters of mercury aid in dissolving and dispersing polymers very little compared to the difficulty and complexity of the operation. Experiments have shown that at about 20 atmospheres the amount of polymer dissolved and dispersed in the treating agent is not appreciably greater.

The following methods are suitable for fixing the sizing composition of the present invention to a polytetrafluoroethylene fabric. Dipping the fabric into the sizing composition, followed by air drying and sintering at the desired temperature with sufficient repetition to build the desired thickness. Spraying the sizing composition onto the fabric is used to advantage for covering large or irregular shapes. Pouring the sizing composition onto the fabric is sometimes used. Painting the sizing composition with brush or roller has been successfully employed. In addition, coatings may be easily applied with metering bars, knives or rods. Usually, the coatings or films are built up to the thickness desired by repetitive drying and sintering.

The polytetrafluoroethylene fabric upon which the sizing composition is to be deposited is cleaned or treated in such a way as to assure uniform contact with the sizing composition. The polytetrafluoroethylene fabric can be cleansed by washing with a degreaser or similar solution followed by drying to remove any dust or oils.

After being cleaned, the polytetrafluoroethylene fabric may be pre-conditioned by heating or vacuum drying prior to contact with the sizing compositions and the coating operation. Temperatures and pressures in the following ranges are preferably used: about 20 millimeters mercury at about 110° C. or thereabout is sufficient in all cases; however, mild heat is usually adequate, on the order of about 50° C. at atmospheric pressure.

After preparation, the polytetrafluoroethylene fabrics are coated with the sizing composition by any of several means including, but not limited to, dipping, spraying, brushing, pouring. Then the sizing composition may be evened out using scraping knives, rods, or other suitable means. The sizing composition can be applied in a single step or in several steps depending on the concentration of the polymer in the sizing composition and the desired thickness of the coating.

Following the application of the sizing composition, the treating agent is removed by any of several methods including, but not limited to, evaporation or extraction.

Extraction is the use of some agent which selectively dissolves or mixes with the treating agent but not the polymer.

These removal means should be employed until a uniform deposition of polymer is obtained.

The treating agent removal is typically carried out by maintaining the coated polytetrafluoroethylene at temperatures ranging from about 10° C. to about 110° C., with the preferred heating range being from about 20° C. to about 100° C. The temperature selected depends upon the boiling point of the treating agent.

Temperatures are customarily in the range of from about 20° C. to about 50° C. for 1,2-dibromotetrafluoroethane.

The pressures employed for the removal of the treating agent from the coated polytetrafluoroethylene can range from about 20 mm mercury to about 760 mm mercury depending on the nature of the treating agent, although pressures are typically in the range of from about 300 mm mercury to about 760 mm mercury for 1,2-dibromotetrafluoroethane.

The formation of the coating can be carried out as part of the polymer deposition and treating agent removal process or as a separate step by adjusting the thermal and pressure conditions associated with the separation of the polymer from the sizing composition. If the sizing composition is laid down in successive steps, a coating can be formed without any subsequent heating above ambient temperature by control of the rate of evaporation. This can be done by vapor/liquid equilibrium in a container or an enclosure; therefore, the treating agent removal step can be merely a drying step or a controlled process for forming a coating.

After the treating agent has been removed, the residual polymer, as a separate step, is preferably subjected to a heat source of from about 250° C. to about 320° C. for times ranging from about 10 seconds to about 120 minutes, depending upon the thermoplastic properties of the polymers. The polymers having melt viscosities on the order of $5 \times 10^5$ poise at about 300° C. at a shear rate of 1 sec.$^{-1}$ as measured by a typical capillary rheometer would require the longer times and higher temperatures within the limits of the chemical group stability. Polymers with viscosities on the order of 1 poise at ambient temperatures would require no further treatment.

The most preferred treatment temperatures are from about 270° C. to about 320° C. and a time of from about 0.2 to about 45 minutes for the most preferred polymers for use in the present invention. Such polymers permeate the fabric under the conditions described above.

EXAMPLES Example 1

A copolymer of $CF_2=CF_2$ and $CF_2=CFOCF_2CF_2SO_2F$ having equivalent weight of about 850. The polymer was prepared according to the following procedure. About 784 grams of $CF_2=CFOCF_2CF_2SO_2F$ was added to about 4700 grams of deoxygenated water containing about 25 grams $NH_4O_2CC_7F_{15}$, about 18.9 grams of $Na_2HPO_4.7H_2O$, about 15.6 grams of $NaH_2PO_4.H_2O$ and about 4 grams of $(NH_4)_2S_2O_8$ under a positive pressure of about 195 pounds per square inch gauge (psig) of tetrafluoroethylene at about 60° C. for about 88 minutes. The reactor was vented under heat and vacuum to remove residual monomers. The reactor contents were frozen, thawed, and vigorously washed to remove residual salts and soap. After vacuum drying, a sizing solution was prepared by placing 35 grams of polymer prepared above in a laboratory-size single tier 290 revolutions per minute roller Norton Jar Mill with 315 grams of 1,2-dibromotetrafluoroethane. The mixture was mixed in the ball mill overnight at ambient temperature and at atmospheric pressure. The dispersant was analyzed and found to contain about 10 weight percent solids.

To the resulting soft paste about 300 additional grams of 1,2-dibromotetrafluoroethane was added and the mill was rolled an additional 3 hours. The resulting dispersion was found to contain about 10 weight percent polymer.

A circle of polytetrafluoroethylene cloth $24 \times 24$ leno weave about six inches in diameter was cut from a supply of polytetrafluoroethylene cloth. It was clamped into a hoop. The hoop and polytetrafluoroethylene cloth were dippened into the sizing composition prepared above. The hoop was removed from the sizing composition and the excess sizing composition was shaken off. After being allowed to air dry, the coated polytetrafluoroethylene cloth was placed in a muffle furnace and kept at about 225° C. for about 1 minute.

The sized polytetrafluoroethylene cloth had been well permeated with the sizing composition and had a good "hand" (as used in textile terminology), compared to the limp cloth before the sizing treatment. The threads, which usually tend to slide about during handling, were then effectively held in place and the polytetrafluoroethylene cloth was easily removed from the hoop.

The sized polytetrafluoroethylene cloth was placed on a film of a carboxylic vinyl ether ester copolymer with tetrafluoroethylene which had been coated onto a 1.5 mil (38.1 microns) thick aluminum foil. The polytetrafluoroethylene cloth was backed by a sheet of silicone rubber. The sheets were placed between photographic plates and polytetrafluoroethylene coated glass cloth and pressed in a hydraulic hot press at about 250° C. at about 5 tons force for about 5 minutes.

The ion exchange film with attached polytetrafluoroethylene fabric was placed in a 25 weight percent aqueous sodium hydroxide solution at room temperature to remove the aluminum foil. The film was inspected with an optical microscope and found to have excellent coating of the polytetrafluoroethylene fabric and adhesion to the film with no detectable holes.

Example 2

A carboxylic ester vinyl ether copolymer with tetrafluoroethylene having an equivalent weight of about 847 was made into a 10 weight percent dispersion in $BrCF_2CF_2Br$. This dispersion was used to coat aluminum foil. The foil was then pressed at about 2 tons pressure at about 250° C. for about 5 minutes. This coated side was then pressed onto a 4 inch by 4 inch piece of about 4 mil (101.6 microns) thick fluorosulfonyl vinyl ether copolymer of about 830 equivalent weight at the same pressing conditions. The fluorosulfonyl side was turned up and polytetrafluoroethylene fabric which had been sized with a fluorosulfonyl dispersion of about 850 equivalent weight polymer (about 10 weight percent in $BrCF_2CF_2Br$) was placed on the film. The polytetrafluoroethylene was backed with a silicone rubber sheet and these were placed between polytetrafluoroethylene covered glass cloth sheets and photographic plates. The entire assembly was pressed for about 35 minutes at about 250° C. at about 2 tons force. Then, the heating was switched off and the reinforced membrane was removed from the press when the temperature had reached about 200° C. The membrane was placed in about 25 weight percent aqueous sodium hydroxide solution at room temperature to remove the aluminum foil.

Example 3

A piece of aluminum foil was coated with an about 856 equivalent weight carboxylic ester copolymer. The carboxylic ester copolymer was then coated with an about 850 equivalent weight fluorosulfonyl copolymer. The coated foil was placed polymer side down on top of a sized polytetrafluoroethylene fabric (Prodesco Inc. 12×12 leno weave cloth) which was in turn placed on a vacuum table. The vacuum was applied and the table was placed under a heated platen for about 4 minutes at about 250° C. The polytetrafluoroethylene fabric was firmly bonded to the support layer polymer.

We claim:

1. A method for forming a supported membrane film comprising:
   (a) at least partially coating a polytetrafluoroethylene fabric with a sizing composition;
   (b) contacting the coated polytetrafluoroethylene fabric with a membrane film having sites convertible to ion exchange groups; and
   (c) heating the polytetrafluoroethylene fabric and the membrane film while maintaining the fabric and the film in contact.

2. The method of claim 1 wherein the sizing composition comprises:
   a perfluorinated polymer containing ion exchange groups in an acid or a salt form or ion exchange groups convertible to an acid or salt form and a treating agent having: a boiling point less than about 110° C.; a density of from about 1.55 to about 2.97 grams per cubic centimeter; and a solubility parameter of from greater than about 7.1 to about 8.2 hildebrands.

3. The method of claim 2 wherein the boiling point of the treating agent is from about 30° C. to about 110° C.

4. The supported membrane produced by the method of claim 3.

5. The method of claim 2 wherein the density of the treating agent is from about 1.55 to about 2.97 grams per cubic centimeter.

6. The supported membrane produced by the method of claim 5.

7. The method of claim 2 wherein the solubility parameter of the treating agent is from greater than about 7.1 to about 8.2 hildebrands.

8. The supported membrane produced by the method of claim 7.

9. The method of claim 2 wherein the density of the treating agent and the density of the polymer are both from about 1.55 to about 2.2 grams per cubic centimeter.

10. The supported membrane produced by the method of claim 9.

11. The method of claim 2 wherein the perfluorinated polymer is a copolymer of a first type of monomer and a second type of monomer:
wherein the first type of monomer is represented by the general formula:

$$CF_2=CZZ' \qquad (I)$$

where: Z and Z' are independently selected from the group consisting of —H, —Cl, —F, or CF$_3$;
the second monomer represented by the general formula:

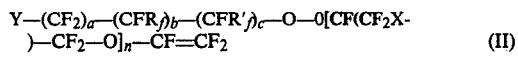
$$Y-(CF_2)_a-(CFR_f)_b-(CFR'_f)_c-O-O[CF(CF_2X)-CF_2-O]_n-CF=CF_2 \qquad (II)$$

where:
Y is selected from the group consisting of —SO$_2$Z, —CN, —COZ and C(R$^3_f$)(R$^4_f$)OH;
Z is I, Br, Cl, F, OR, or NR$_1$R$_2$;
R is a branched or linear alkyl radical having from 1 to about 10 carbon atoms or an aryl radical;
R$^3_f$ and R$^4_f$ are independently selected from the group consisting of perfluoralklyl radicals having from 1 to about 10 carbon atoms;
R$_1$ and R$_2$ are independently selected from the group consisting of H, a branched or linear alkyl radical having from 1 to about 10 carbon atoms or an aryl radical;
a is 0–6;
b is 0–6;
c is 0 or 1;
provided a+b+c is not equal to 0;
X is Cl, Br, F or mixtures thereof when n>1;
n is 0 to 6; and
R$_f$ and R'$_f$ are independently selected from the group consisting of F, Cl, perfluoroalkyl radicals having from 1 to about 10 carbon atoms and fluorochloroalkyl radicals having from 1 to about 10 carbon atoms.

12. The supported membrane produced by the method of claim 11.

13. An electrochemical cell of the type having an anode and a cathode separated by an ion exchange membrane film, wherein the film is the film produced by the method of claim 11.

14. An electrochemical process comprising passing electrical current between the anode and the cathode of the cell of claim 13.

15. The method of claim 2 wherein the perfluorinated polymer is a copolymer formed from three types of monomers wherein the third type of monomer is one or more monomers represented by the general formula:

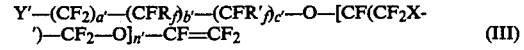
$$Y'-(CF_2)_{a'}-(CFR_f)_{b'}-(CFR'_f)_{c'}-O-[CF(CF_2X')-CF_2-O]_{n'}-CF=CF_2 \qquad (III)$$

where:
Y' is F, Cl or Br;
a' and b' are independently 0–3;
c' is 0 or 1;
provided a'+b'+c' is not equal to 0;
n' is 0–6;
R$_f$ and R'$_f$ are independently selected from the group consisting of Br, Cl, F, perfluoroalkyl radicals having from about 1 to about 10 carbon atoms, and chloroperfluoroalkyl radicals having from about 1 to about 10 carbon atoms; and
X' is F, Cl, Br, or mixtures thereof when n'>1.

16. The supported membrane produced by the method of claim 15.

17. An electrochemical cell of the type having an anode and a cathode separated by an ion exchange membrane film, wherein the film is the film produced by the method of claim 15.

18. An electrochemical process comprising passing electrical current between the anode and the cathode of the cell of claim 17.

19. The supported membrane produced by the method of claim 2.

20. The supported membrane produced by the method of claim 19.

21. The method of claim 1 wherein the membrane filmed is a copolymer of a first type of monomer and a second type of monomer:

wherein the first monomer is represented by the general formula:

$$CF_2=CZZ' \qquad (I)$$

where: Z and Z' are independently selected from the group consisting of —H, —Cl, —F, or $CF_3$;

the second type of monomer is a fluorovinyl compound represented by the general formula:

$$Y-(CF_2)_a-(CFR_f)_b-(CFR'_f)_c-O-[CF(CF_2X)-CF_2-O]_n-CF=CF_2 \qquad (II)$$

where:

Y is selected from the group consisting of —$SO_2Z$, —CN, —COZ and $C(R^3_f)(R^4_f)OH$;

Z is I, Br, Cl, F, OR, or $NR_1R_2$;

R is a branched or linear alkyl radical having from 1 to about 10 carbon atoms or an aryl radical;

$R^3_f$ and $R^4_f$ are independently selected from the group consisting of perfluoralklyl radicals having from 1 to about 10 carbon atoms;

$R_1$ and $R_2$ are independently selected from the group consisting of H, a branched or linear alkyl radical having from 1 to about 10 carbon atoms or an aryl radical;

a is 0–6;

b is 0–6;

c is 0 or 1;

provided a+b+c is not equal to 0;

X is Cl, Br, F or mixtures thereof when n>1;

n is 0 to 6; and $R_f$ and $R'_f$ are independently selected from the group consisting of F, Cl, perfluoroalkyl radicals having from 1 to about 10 carbon atoms and fluorochloroalkyl radicals having from 1 to about 10 carbon atoms.

22. The method of claim 21 wherein the perfluorinated polymer is a copolymer formed from three types of monomers wherein the third type of monomer is one or more monomers represented by the general formula:

$$Y'-(CF_2)_{a'}-(CFR_f)_{b'}-(CFR'_f)_{c'}-O-[CF(CF_2X')-CF_2-O]_{n'}-CF=CF_2 \qquad (III)$$

where:

Y' is F, Cl or Br;

a' and b' are independently 0–3;

c' is 0 or 1;

provided a'+b'+c' is not equal to 0;

n' is 0–6;

$R_f$ and $R'_f$ are independently selected from the group consisting of Br, Cl, F, perfluoroalkyl radicals having from about 1 to about 10 carbon atoms, and chloroperfluoroalkyl radicals having from about 1 to about 10 carbon atoms; and X' is F, Cl, Br, or mixtures thereof when n'>1.

23. The supported membrane produced by the method of claim 22.

24. An electrochemical cell of the type having an anode and a cathode separated by an ion exchange membrane film, wherein the film is the film produced by the method of claim 22.

25. An electrochemical process comprising passing electrical current between the anode and the cathode of the cell of claim 24.

26. The supported membrane produced by the method of claim 21.

27. An electrochemical cell of the type having an anode and a cathode separated by an ion exchange membrane film, wherein the film is the film produced by the method of claim 3.

28. An electrochemical process comprising passing electrical current between the anode and the cathode of the cell of claim 27.

29. The method of claim 1 wherein the polytetrafluoroethylene fabric and the membrane film are heated to a temperature of from about 50° to about 320° C.

30. The supported membrane produced by the method of claim 29.

31. The method of claim 1 wherein the polytetrafluoroethylene fabric and the membrane film are heated under a pressure of up to about 2000 pounts per square inch.

32. The supported membrane produced by the method of claim 31.

33. The supported membrane produced by the method of claim 1.

34. The supported membrane produced by the method of claim 33.

* * * * *

UNITED STATES PATENT AND TRADEMARK OFFICE
CERTIFICATE OF CORRECTION

PATENT NO. : 4,650,551

DATED : March 17, 1987

INVENTOR(S) : William P. Carl and Jeffrey D. Birdwell

It is certified that error appears in the above-identified patent and that said Letters Patent is hereby corrected as shown below:

Col. 4, line 9; change "treatment" to --treating--.

Col. 6, line 14; insert --of-- between "millimeters" and "mer-".

Col. 10, Claim 11, lines 6-7 in the formula (II); delete the number zero "0".

Col. 11, Claim 21, line 9; change "filmed" to --film--.

Signed and Sealed this

Twenty-second Day of September, 1987

Attest:

DONALD J. QUIGG

Attesting Officer     Commissioner of Patents and Trademarks